US012291048B2

(12) United States Patent
Osano

(10) Patent No.: US 12,291,048 B2
(45) Date of Patent: May 6, 2025

(54) CONTROL DEVICE, CONTROL METHOD, AND SYSTEM

(71) Applicant: SEIKO EPSON CORPORATION, Tokyo (JP)

(72) Inventor: Hiroka Osano, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/343,063

(22) Filed: Jun. 28, 2023

(65) Prior Publication Data

US 2024/0001699 A1 Jan. 4, 2024

(30) Foreign Application Priority Data

Jun. 29, 2022 (JP) ................................ 2022-104308

(51) Int. Cl.

| | |
|---|---|
| ***B41J 11/06*** | (2006.01) |
| ***B41J 3/28*** | (2006.01) |
| ***B41J 11/00*** | (2006.01) |
| ***B41L 39/02*** | (2006.01) |
| ***B41L 39/16*** | (2006.01) |
| *B41M 1/14* | (2006.01) |
| *B41M 7/00* | (2006.01) |

(52) U.S. Cl.

CPC ................ *B41L 39/16* (2013.01); *B41J 3/28* (2013.01); *B41J 11/0085* (2013.01); *B41J 11/06* (2013.01); *B41L 39/02* (2013.01); *B41M 1/14* (2013.01); *B41M 7/009* (2013.01)

(58) Field of Classification Search

USPC ........................................................ 400/48

See application file for complete search history.

(56) References Cited

U.S. PATENT DOCUMENTS

2013/0127967 A1* 5/2013 Palarya ................ B41J 11/0085 347/104
2017/0057255 A1* 3/2017 Byrne, III ............ B41J 11/0085
2017/0315765 A1 11/2017 Lange et al.
2017/0368850 A1* 12/2017 Eveilleau ............. B41J 13/0009
2020/0404112 A1* 12/2020 Tsuchida .................. B65H 5/14
2022/0410594 A1* 12/2022 Yoshikawa .......... B41J 11/0085

FOREIGN PATENT DOCUMENTS

JP 2016007742 A * 1/2016
JP 2018513028 A 5/2018

OTHER PUBLICATIONS

English language translation of JP 2016-7742 A to Aoyama, publication date Jan. 18, 2016. (Year: 2016).*

* cited by examiner

*Primary Examiner* — Leslie J Evanisko

(74) *Attorney, Agent, or Firm* — CHIP LAW GROUP

(57) ABSTRACT

A control device for controlling an image processing apparatus including a disposition unit on which a printing medium is disposed and which has a plurality of suction holes for sucking the printing medium includes a display controller that displays, on a display, a display screen which is a screen showing the positions of the plurality of suction holes in the disposition unit, a selection receiver that receives selection of suction holes from the plurality of suction holes whose positions are displayed on the display screen, and an execution controller that performs control such that a suction operation is executed through at least some of the selected suction holes.

9 Claims, 8 Drawing Sheets

CONTROL DEVICE, CONTROL METHOD, AND SYSTEM

The present application is based on, and claims priority from JP Application Serial Number 2022-104308, filed Jun. 29, 2022, the disclosure of which is hereby incorporated by reference herein in its entirety.

BACKGROUND

1. Technical Field

The present disclosure relates to a control device, a control method, and a system.

2. Related Art

Printers for performing printing while fixing printing media, such as flatbed type printers, fix a printing medium during printing by sucking air from suction holes provided in a disposition unit on which the printing medium is disposed. In JP-T-2018-513028, a configuration of a flatbed printer for sucking air from suction holes provided in a platen for media in order to support media is disclosed.

In the related art, in order to realize suction in a desired mode, a user directly checks the positions of a plurality of suction holes in the disposition unit for printing media, determines suction holes to perform suction and suction holes not to perform suction, and manually performs a task of adjusting whether to perform suction of each suction hole (for example, a task of disposing a sheet or the like to block suction holes). Further, during suction, when air comes out from suction holes in an area of the disposition unit in which a printing medium is not disposed, the force for fixing the printing medium may decrease, and the power consumption required for suction may increase; therefore, the suction from those suction holes is not desirable. For this reason, it is desired to reduce the user's work burden for realizing a suction mode desired by the user.

SUMMARY

According to an aspect of the present disclosure, there is provided a control device for controlling an image processing apparatus including a disposition unit on which a printing medium is disposed and which has a plurality of suction holes for sucking the printing medium. The control device includes a display control unit that displays, on a display unit, a display screen which is a screen showing the positions of the plurality of suction holes in the disposition unit, a selection receiving unit that receives selection of suction holes from the plurality of suction holes whose positions are displayed on the display screen, and an execution control unit that performs control such that a suction operation is executed through at least some of the selected suction holes.

BRIEF DESCRIPTION OF THE DRAWINGS

FIG. 1 illustrates an example of the configuration of a control device and so on.

DESCRIPTION OF EXEMPLARY EMBODIMENTS

Herein, embodiments of the present disclosure will be described in the following order:

(1) First Embodiment (1-1) Configuration of Control Device (1-2) Suction Control Process (2) Second Embodiment (3) Third Embodiment (4) Other Embodiments

(1) First Embodiment (1-1) Configuration of Control Device

Figure 1:
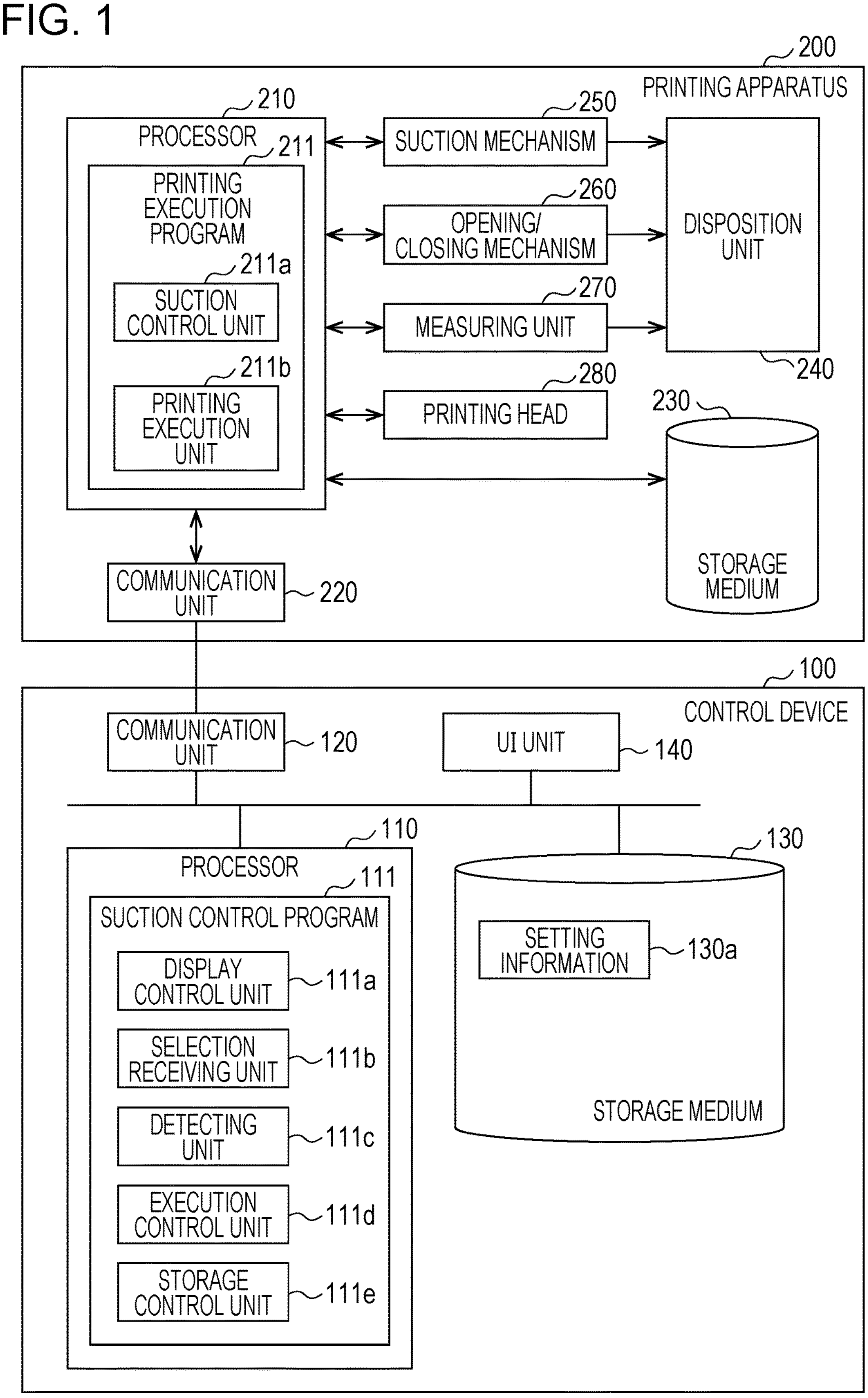

FIG. 1 illustrates an example of the configurations of a control device 100 and a printing apparatus 200 according to the present embodiment. The control device 100 of the present embodiment is an information processing device for controlling the printing apparatus 200, and is, for example, a personal computer, a tablet device, a smartphone, a computer built into the printing apparatus 200, or the like. The printing apparatus 200 is an image processing apparatus for printing images on printing media (for example, transparent or opaque acrylic boards, glass sheets, resin media (such as resin smartphone cases), printing paper, or the like) in response to instructions from the control device 100. In the present embodiment, the printing apparatus 200 performs printing on printing media using predetermined inks (such as color inks and special color inks). In the present embodiment, the predetermined inks are color inks (cyan (C), magenta (M), yellow (Y), and black (K) inks) and a special color ink. The special color ink is an ink for expressing a color which cannot be expressed by the color inks and giving an effect such as gloss, and is a white ink, a varnish ink, or the like. The printing apparatus 200 of the present embodiment is a flatbed type printing apparatus, and performs printing using inks which are cured by irradiation with ultraviolet light.

In the present embodiment, the printing apparatus 200 performs printing by ejecting ink onto a printing medium and irradiating the ejected ink with ultraviolet light. The control device 100 and the printing apparatus 200 are coupled so as to be capable of wired or wireless communication with each other.

Hardware which is included in the control device 100 and the printing apparatus 200 will be described.

The control device 100 includes a processor 110, a communication unit 120, a storage medium 130, and a UI unit 140. Further, the control device 100 includes a random access memory (RAN) and a read only memory (ROM) (not shown in the drawings). The processor 110 controls the control device 100 by executing various programs which are stored in the ROM, the storage medium 130, or the like. The processor 110 may be configured with a single chip, or may be configured with a plurality of chips. Also, in the present embodiment, the processor 110 is a central processing unit (CPU); however, it may be configured with an ASIC and so on, or may be configured with a CPU and an ASIC. The communication unit 120 includes a circuit usable for wired or wireless communication with an external device such as the printing apparatus 200 according to various communication protocols.

The storage medium 130 stores various programs such as a suction control program 111 for executing a process of controlling suction through suction holes in the printing apparatus 200, and a variety of information such as setting information 130*a*.

The setting information 130*a* is information indicating whether each of a plurality of suction holes, for sucking printing media, provided in a disposition unit of the printing apparatus 200 where printing media can be disposed has been selected or not. The suction holes are holes provided in the disposition unit of the printing apparatus 200 where printing media can be disposed so as to be usable to suck air, printing media, and so on. In the present embodiment, the processor 110 stores the setting information 130*a* in the storage medium 130 via a display screen 300 to be described below.

The UI unit 140 includes an input unit for receiving input from a user, for example, via a mouse, a keyboard, or operation portions of a touch pad or a touch panel, a display unit such as a monitor or a touch panel, and an output unit usable for presenting information to a user, such as a speaker.

The printing apparatus 200 includes a processor 210, a communication unit 220, a storage medium 230, a disposition unit 240, a suction mechanism 250, opening/closing mechanisms 260, measuring units 270, and a printing head 280. Further, the printing apparatus 200 includes a RAM and a ROM (not shown in the drawings). The processor 210 controls the printing apparatus 200 by executing various programs which are stored in the ROM, the storage medium 230, or the like. The processor 210 may be configured with a single chip, or may be configured with a plurality of chips. Also, in the present embodiment, the processor 210 is a CPU; however, it may be configured with an ASIC and so on, or may be configured with a CPU and an ASIC. The communication unit 220 includes a circuit usable for wired or wireless communication with an external device such as the control device 100 according to various communication protocols. The storage medium 230 stores various programs such as a printing execution program 211 for controlling execution of printing, and a variety of information.

Figure 2:
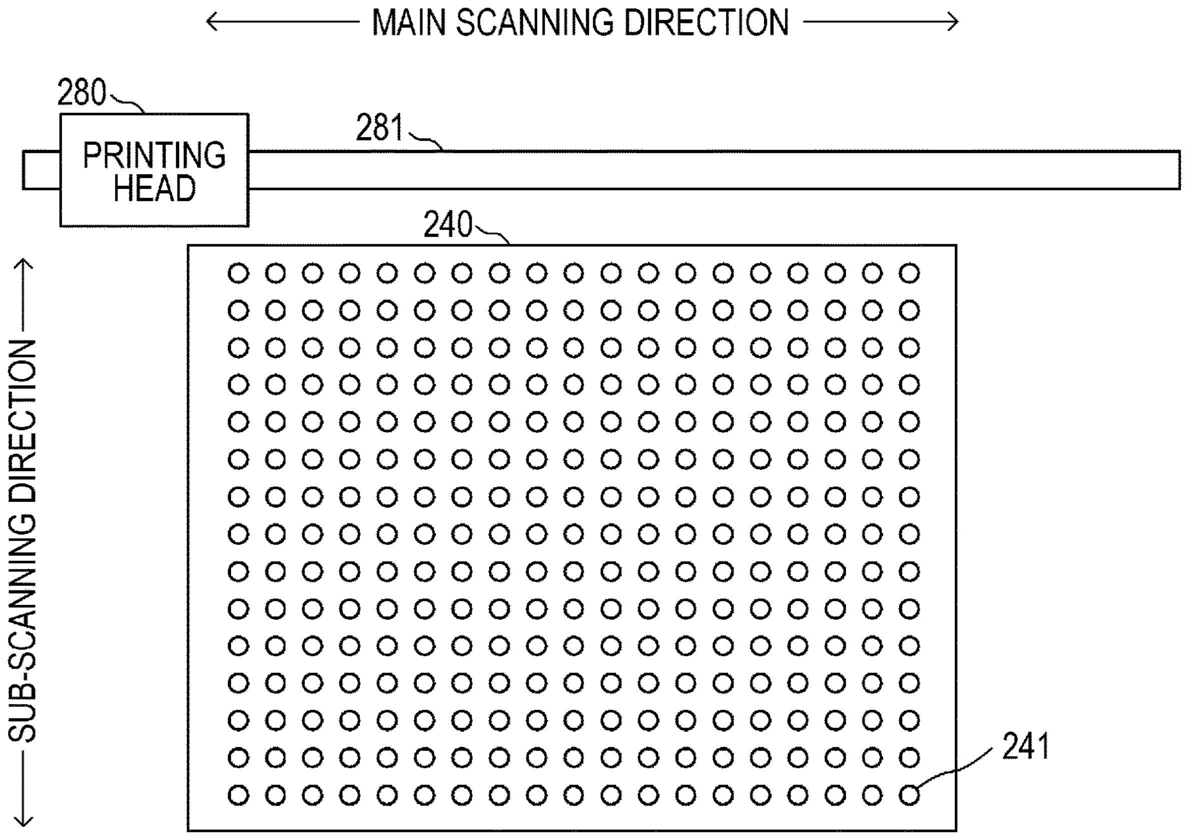
FIG. 2 illustrates a plan view and so on of an example of a disposition unit.

The disposition unit 240 is a platform having a planar portion (hereinafter, referred to as the disposition surface) where printing media are disposed during printing. The configuration of the disposition unit 240 will be described using FIG. 2. In FIG. 2, a plan view of the disposition unit 240 is shown. In other words, FIG. 2 shows the appearance of the disposition unit 240 when the disposition surface is viewed downward in a direction perpendicular to the disposition surface. The disposition surface of the disposition unit 240 has a plurality of suction holes 241.

Each of the suction holes 241 is a hole provided in the disposition surface, is coupled to the suction mechanism 250 to be described below, and is used in air suction by the suction mechanism 250. The suction mechanism 250 is a mechanism which has a fan usable to suck air and which sucks air.

Further, each of the suction holes 241 has an opening/closing mechanism 260. Each opening/closing mechanism 260 is a mechanism for switching the suction hole 241 between an open state (a state where the suction hole 241 is open) and a closed state (a state where the suction hole 241 is blocked). Each of the suction holes 241 is opened and closed by the opening/closing mechanism 260. The measuring units 270 are sensors which are provided in spaces coupled to the suction holes 241 and which measure the pressures applied to the gas in the spaces coupled to the suction holes 241 (gas pressures) when air is sucked through the suction mechanism 250.

The printing head 280 ejects ink onto printing media and performs irradiation with ultraviolet light. The printing head 280 is supported by a linear gantry 281 so as to be movable along the gantry 281. The processor 210 performs ejection of ink onto printing media and irradiation with ultraviolet light while moving the printing head 280 via a mechanism configured to drive the printing head 280. The processor 210 performs printing by repeating printing on printing media in units of lines via the printing head 280. Hereinafter, the line direction will be referred to as the main scanning direction. The direction in which the printing head 280 can move along the gantry 281 is the main scanning direction. Also, hereinafter, a direction which is perpendicular to the main scanning direction and which is parallel with the disposition surface will be referred to as a sub-scanning direction. Further, hereinafter, printing of one line which the printing head 280 during printing performs while moving above a printing medium from an end of a printing area to the other end in the main scanning direction will be referred to as one printing pass. Furthermore, the number of times a printing pass needs to be performed for printing the same area in the printing area will be referred to as the number of printing passes. The printing head 280 includes an ejecting portion which is used to eject various kinds of ink, and an irradiation portion that irradiates the ejected ink with ultraviolet light. The processor 210 performs printing by repeating a process of changing the position of the gantry 281 in the sub-scanning direction and performing scanning in the main scanning direction by the printing head 280.

As shown in FIG. 2, the suction holes 241 are arranged in a matrix, and are provided in lines at regular intervals in the main scanning direction and the sub-scanning direction. Hereinafter, the lines of suction holes 241 arranged in the main scanning direction will be referred to as the rows. Further, hereinafter, the lines of suction holes 241 arranged in the sub-scanning direction will be referred to as the columns.

Now, the functions of the control device 100 and the printing apparatus 200 will be described.

The processor 110 of the control device 100 functions as a display control unit 111*a*, a selection receiving unit 111*b*, a detecting unit 111*c*, an execution control unit 111*d*, and a storage control unit 11*e* by executing the suction control program 111 stored in the storage medium 130.

The display control unit 111*a* has a function of controlling a display unit such that the display unit displays a screen showing the positions of the plurality of suction holes 241 in the disposition unit 240.

Figure 3:
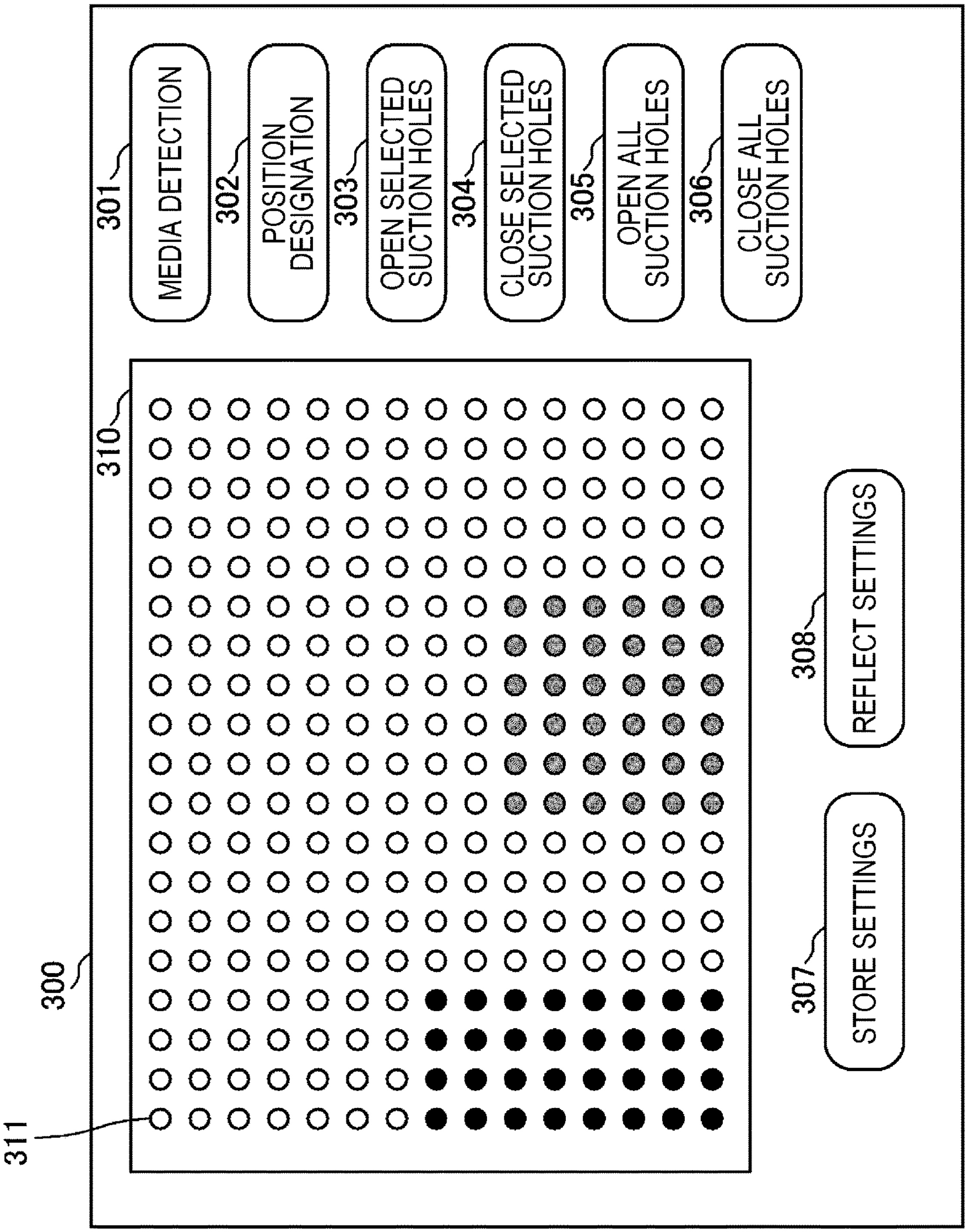
FIG. 3 illustrates an example of a display screen.

When the processor 110 receives, via the UI unit 140, an instruction to display a screen showing the positions of the plurality of suction holes 241 in the disposition unit 240, it controls the UI unit 140 by the function of the display control unit 111*a* such that the UI unit displays the display screen 300. An example of the display screen 300 is shown in FIG. 3.

The display screen 300 shows the positions of the plurality of suction holes 241 in the disposition unit 240, and is used to select suction holes to perform suction. Also, selecting suction holes to perform suction can be regarded as selecting the other suction holes as suction holes not to perform suction.

The display screen 300 includes selection assistance buttons 301 and 302, an opening instruction button 303, a closing instruction button 304, an all-opening instruction button 305, an all-closing instruction button 306, a setting storing button 307, a setting reflecting button 308, and a display area 310.

The display area 310 is an area showing the disposition surface of the disposition unit 240. In the present embodiment, the lower end of the display area 310 indicates a predetermined one of the two ends of the disposition surface of the disposition unit 240 in the sub-scanning direction. Also, the upper end of the display area 310 indicates the other of the two ends of the disposition surface of the disposition unit 240 in the sub-scanning direction. Further, the left end of the display area 310 indicates a predetermined one of the two ends of the disposition surface of the disposition unit 240 in the main scanning direction. Furthermore, the right end of the display area 310 indicates the other of the two ends of the disposition surface of the disposition unit 240 in the main scanning direction. The processor 110 displays circular objects 311 representing the plurality of corresponding suction holes 241 at the positions in the display area 310 corresponding to the suction holes 241. In this way, the position of each of the plurality of suction holes 241 in the disposition unit 240 is shown in the display area 310. The processor 110 sets the states of the individual suction holes 241 to a first state which is a state indicating that the suction holes have not been selected by the user. Herein, the state of each suction hole 241 is information which is set for the suction hole 241, and is information usable to control whether to open or close the suction hole 241. The processor 110 stores, in the RAM, information indicating that the state of each suction hole 241 is the first state. Further, the processor 110 displays the objects 311 corresponding to the suction holes 241 which are in the first state in a predetermined color (hereinafter, referred to as the first color). In the present embodiment, the first color is white. As described in the following description of the selection receiving unit 111*b*, when the processor 110 receives selection of objects 311, the processor switches the suction holes 241 corresponding to the objects 311 to a second state which is a state indicating that the suction holes have been selected by the user. More specifically, for each suction hole 241 switched to the second state, the processor 110 stores, in the RAM, information indicating that the suction hole 241 is in the second state.

The selection assistance button 301 is a button usable to instruct a process of detecting the area of a printing medium disposed on the disposition unit 240 and setting the suction holes 241 in the detected area to the second state.

The selection assistance button 302 is a button usable to instruct a process of setting suction holes 241 included in a designated position to the second state.

The opening instruction button 303 is a button usable to instruct a process of opening suction holes 241 which are in the second state and closing suction holes 241 which are in the first state.

The closing instruction button 304 is a button usable to instruct a process of closing suction holes 241 which are in the second state and opening suction holes 241 which are in the first state.

The all-opening instruction button 305 is a button usable to instruct a process of opening all of the suction holes 241.

The all-closing instruction button 306 is a button usable to instruct a process of closing all of the suction holes 241.

The setting storing button 307 is a button usable to instruct a process of storing, as the setting information 130*a*, information indicating whether each suction hole 241 in the disposition unit 240 is in the first state or the second state.

The setting reflecting button 308 is a button usable to instruct a process of reflecting the states of the individual objects 311 stored in the setting information 130*a* in the individual objects 311.

The above is a description of the display control unit 11*a*.

The selection receiving unit 111*b* has a function of receiving selection of suction holes 241 from the plurality of suction holes 241 whose positions are displayed on the display screen 300.

In the present embodiment, the processor 110 receives selection for each suction hole 241 by the function of the selection receiving unit 111*b*. More specifically, when a user designates objects 311 corresponding to suction holes 241 which are in the first state by operating the UI unit 140 (for example, by clicking, tapping, or the like), the processor 110 receives the designation, and switches the suction holes 241 corresponding to the designated objects 311 to the second state. The processor 110 displays objects 311 corresponding to suction holes 241 which are in the second state in a color different from that for the first state (hereinafter, referred to as the second color). In the present embodiment, the second color is black. In the example of FIG. 3, suction holes 241 corresponding to objects 311 in a left lower portion of the display area 310 are in the second state. In addition, when the processor 110 receives designation of objects 311 corresponding to suction holes 241 which are in the second state, it switches the suction holes 241 corresponding to the designated objects 311 to the first state, and displays the corresponding objects 311 in the first color (white). In this way, the processor 110 switches the suction hole 241 corresponding to each object 311 to one of the second state and the first state when the user designates the object 311 via the UI unit 140. The processor 110 selects suction holes 241 to perform suction by switching each suction hole 241 to one of the first state and the second state.

Also, when the user designates the selection assistance button 301 by operating the UI unit 140, the processor 110 receives the designation and performs the following process.

The processor 110 detects the area of a printing medium disposed on the disposition unit 240 of the printing apparatus 200. Now, a description of the detecting unit 111*c* will be made.

The detecting unit 111*c* has a function of detecting the area of a printing medium disposed on the disposition unit 240, based on the pressures in the plurality of suction holes 241 during a suction operation.

When a printing medium is disposed on the disposition unit 240 of the printing apparatus 200, by the function of the detecting unit 111*c*, the processor 110 instructs the printing apparatus 200 to operate the suction mechanism 250 at a predetermined drive power in a state where all suction holes 241 are open. In response to the instruction, the processor 210 of the printing apparatus 200 operates the suction mechanism 250 at the predetermined drive power. Further, the processor 110 instructs the printing apparatus 200 to measure the gas pressure in each of the spaces coupled to the suction holes 241. The processor 210 of the printing apparatus 200 periodically measures the gas pressures in the spaces coupled to the individual suction holes 241 via the measuring units 270, and waits until the gas pressures in the spaces coupled to the individual suction holes 241 become stable (until the gas pressures no longer change so as to exceed a predetermined threshold). Then, the processor 210 measures the gas pressures in the spaces coupled to the individual suction holes 241, and notifies the control device 100 of the measured gas pressures. For each suction hole 241, the processor 110 compares the received gas pressure with a calibration value measured in advance. Such calibration values are the gas pressures, in the spaces coupled to the individual suction holes 241, which are measured via the measuring units 270 when the suction mechanism 250 is operated at the predetermined drive power in a state where there is nothing disposed on the disposition unit 240 and all of the suction holes 241 are open. The calibration values are also values measured after the suction mechanism 250 is operated and the gas pressures in the spaces coupled to the individual suction holes 241 become stable. The processor 110 specifies, among the suction holes 241, suction holes 241 in which differences obtained by subtracting the calibration values from the measured gas pressures are equal to or larger than a predetermined threshold. Then, the processor 110 determines that the printing medium covers the specified suction holes 241, and detects the area around the specified suction holes 241 as a printing medium area.

The description of the selection receiving unit 111*b* will be continued.

Figure 4:
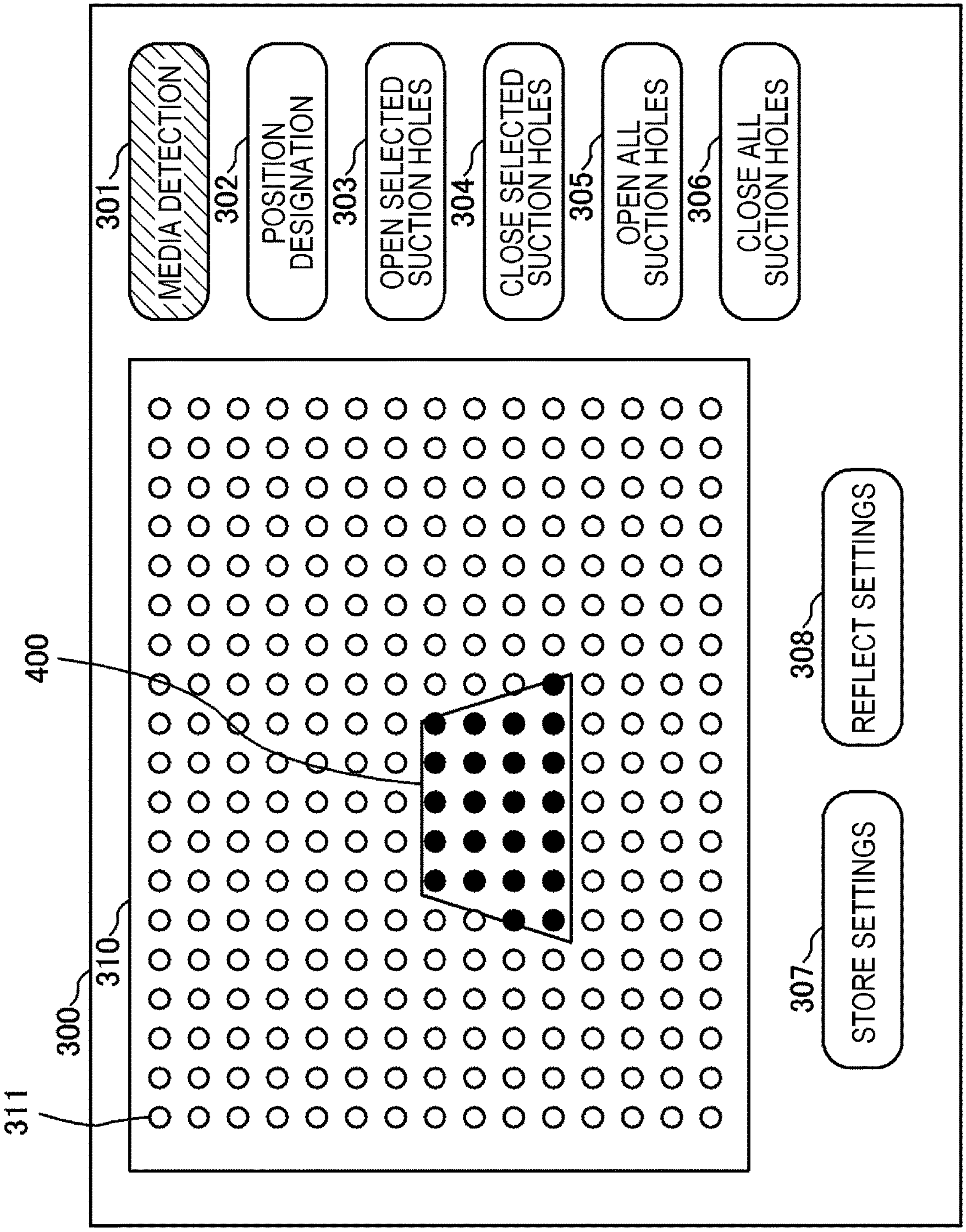
FIG. 4 illustrates an example of the display screen.

The processor 110 switches, to the second state, the suction holes 241 included in the printing medium area detected by the function of the detecting unit 111*c*, and displays, in the second color, the objects 311 corresponding to the suction holes 241 switched to the second state. In other words, according to designation of the selection assistance button 301, selection of the suction holes 241 in the printing medium area is received. In addition, the processor 110 displays an object indicating the printing medium at the position in the display area 310 corresponding to the specified printing medium area. FIG. 4 shows an example of a situation in which the selection assistance button 301 has been designated.

The processor 110 specifies the area of a printing medium, and displays an object 400 indicating the printing medium in an area in the display area 310 corresponding to the specified area. In the example of FIG. 4, since the printing medium is trapezoidal, the object 400 is also trapezoidal. Further, the processor 110 switches, to the second state, the suction holes 241 included in the specified area, and displays, in the second color (black), the objects 311 corresponding to the suction holes 241 switched to the second state. In the example of FIG. 4, the objects 311 in the object 400 correspond to the suction holes 241 which are in the second state, and are displayed in black.

Also, when the user designates the selection assistance button 302 by operating the UI unit 140, the processor 110 receives the designation and performs the following process.

Figure 5:
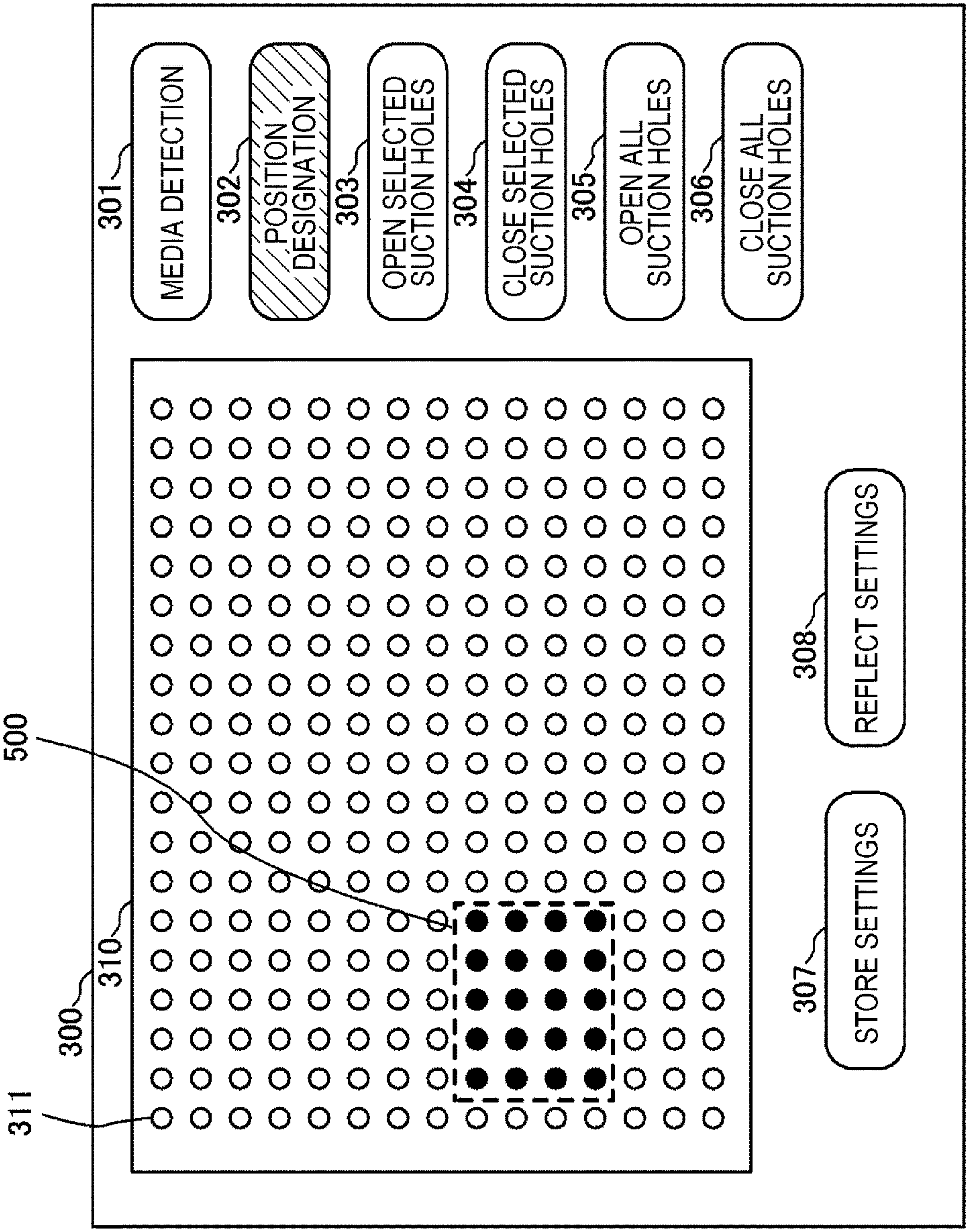
FIG. 5 illustrates an example of the display screen.

The processor 110 displays, on the UI unit 140, a dialog for receiving designation of a position in the disposition unit 240. In the present embodiment, the dialog includes an input field for positions in the disposition unit 240. The user inputs a desired position in the input field by using the UI unit 140. The processor 110 receives the input position as a designated position. However, the processor 110 may receive a designated position by a drag operation or the like via the UI unit 140. The processor 110 switches, to the second state, the objects 311 corresponding to the suction holes 241 included in the input position. Further, the processor 110 displays an object indicating the designated position at a position in the display area 310 corresponding to the input position. FIG. 5 shows an example of a situation in which the selection assistance button 302 has been selected.

The processor 110 displays an object 500 indicating the designated position at a position corresponding to the designated position. In the example of FIG. 5, since the area of a rectangular printing medium is designated, the object 500 is also rectangular. Further, the processor 110 switches, to the second state, the suction holes 241 included in the designated position. In other words, according to designation of the selection assistance button 302, selection of the suction holes 241 included in the designated position is received. In the example of FIG. 5, the objects 311 in the object 500 correspond to the suction holes 241 which are in the second state, and are displayed in black.

Also, when the user designates the setting reflecting button 308 by operating the UI unit 140, the processor 110 receives the description, and performs the following process. The processor 110 displays a dialog usable to select the setting information 130*a*, on the UI unit 140. Further, the processor 110 receives selection of the setting information 130*a* via the displayed dialog. The processor 110 updates the states of the individual suction holes 241 as indicated by the selected setting information 130*a*. Further, the processor 110 displays, in the first color (white), the objects 311 corresponding to the suction holes 241 which are in the first state. Furthermore, the processor 110 displays the objects 311 corresponding to the suction holes 241 which are in the second state in a predetermined color (hereinafter, referred to as the third color) different from the first color and the second color in order to indicate that the setting information 130*a* has been reflected. In the present embodiment, the third color is gray. In the example of FIG. 3, the objects 311 in the lower center portion of the display area 310 correspond to the suction holes 241 switched to the second state during the reflection of the setting information 130*a*, and are displayed in the third color (gray). The state in FIG. 3 shows a state where the setting information 130*a* has been reflected according to designation of the setting reflecting button 308 and then the objects 311 in the lower left portion of the display area 310 have been selected by the user.

The above is a description of the selection receiving unit 111*b*.

The execution control unit 111*d* has a function of performing control such that a suction operation is executed through at least some of the selected suction holes.

When the user designates the opening instruction button 303 by operating the UI unit 140, the processor 110 receives the designation, and performs the following process by the function of the execution control unit 111*d*. The processor 110 instructs the printing apparatus 200 to open the suction holes 241 which are in the second state. Also, the processor 110 instructs the printing apparatus 200 to close the suction holes 241 which are in the first state. In response to the instructions, the processor 210 of the printing apparatus 200 opens the suction holes 241 which are in the second state and closes the suction holes 241 which are in the first state, by the opening/closing mechanisms 260. Then, the processor 110 instructs the printing apparatus 200 to perform an operation of sucking air from the open suction holes 241. In response to the instruction, the processor 210 of the printing apparatus 200 starts suction by the suction mechanism 250. In this way, in the printing apparatus 200, suction is performed such that the printing medium on the open suction holes 241 is fixed. As described above, when the opening instruction button 303 is designated, the suction holes 241 which are in the second state are selected as suction holes 241 to perform suction. Further, the suction holes 241 which are in the first state are selected as suction holes 241 not to perform suction.

Also, when the user designates the closing instruction button 304 by operating the UI unit 140, the processor 110 receives the designation, and performs the following process by the function of the execution control unit 111*d*. The processor 110 instructs the printing apparatus 200 to close the suction holes 241 which are in the second state. Also, the processor 110 instructs the printing apparatus 200 to open the suction holes 241 which are in the first state. In response to the instructions, the processor 210 of the printing apparatus 200 closes the suction holes 241 which are in the second state and opens the suction holes 241 which are in the first state, by the opening/closing mechanisms 260. Like this, the handling of the second state and the first state is opposite to that when the opening instruction button 303 has been designated. In other words, when the closing instruction button 304 is designated, the suction holes 241 which are in the first state are selected as suction holes 241 to perform suction. Further, the suction holes 241 which are in the second state are selected as suction holes 241 not to perform suction. Then, the processor 110 instructs the printing apparatus 200 to perform an operation of sucking air from the open suction holes 241. In response to the instruction, the processor 210 of the printing apparatus 200 starts suction by the suction mechanism 250. As a result, the printing medium on the open suction holes 241 is fixed.

Also, when the user designates the all-opening instruction button 305 by operating the UI unit 140, the processor 110 receives the designation, and performs the following process by the function of the execution control unit 111*d*. The processor 110 instructs the printing apparatus 200 to open all of the suction holes 241 by the opening/closing mechanisms 260. Further, the processor 110 instructs the printing apparatus 200 to perform suction of air from the open suction holes 241 by the suction mechanism 250 in order to control the printing apparatus 200 such that the printing apparatus 200 executes suction.

Also, when the user designates the all-closing instruction button 306 by operating the UI unit 140, the processor 110 receives the designation, and performs the following process by the function of the execution control unit 111*d*. The processor 110 closes all of the suction holes 241 by the opening/closing mechanisms 260.

The above is a description of the execution control unit 111*d*.

The storage control unit 11*e* has a function of storing information on whether each suction hole 241 is in the second state or the first state in the storage medium 130.

When the setting storing button 307 is designated via the UI unit 140, by the function of the storage control unit 11*e*, the processor 110 specifies whether each suction hole 241 is in the first state or the second state, and stores the specified information as setting information 130*a* in the storage medium 130.

Now, the function of the printing apparatus 200 will be described.

The processor 210 of the printing apparatus 200 functions as a suction control unit 211*a* and a printing execution unit 211*b* by executing the printing execution program 211 stored in the storage medium 230.

The suction control unit 211*a* has a function of executing opening and closing of the suction holes 241 and a suction operation in response to an opening/closing instruction for the suction holes 241 and a suction operation instruction from the control device 100. When the processor 210 receives an instruction to open suction holes 241 from the control device 100, it opens the designated suction holes 241 and closes the other suction holes 241 by the opening/closing mechanisms 260. Also, when the processor 210 receives a suction operation instruction from the control device 100, it executes an operation of sucking air from the open suction holes 241 by the suction mechanism 250.

The printing execution unit 211*b* has a function of executing printing of a print layer on a printing medium in response to a printing instruction from the control device 100. In response to an instruction from the control device 100, the processor 210 prints a designated image on a printing medium under a designated printing condition by the function of the printing execution unit 211*b*. In the present embodiment, the processor 210 performs printing by the function of the printing execution unit 211*b* while executing a suction operation by the function of the suction control unit 211*a*. Therefore, the processor 210 can perform printing in a state where a printing medium is fixed.

As described above, in the present embodiment, the control device 100 displays the positions of the individual suction holes 241 in the disposition unit 240, on the display screen 300. Further, after suction holes 241 to be opened are selected from the suction holes 241 corresponding to the displayed positions, and the printing apparatus 200 opens the selected suction holes 241, the control device 100 controls the printing apparatus 200 such that the printing apparatus 200 executes a suction operation.

Therefore, the user can easily check the positions of the suction holes 241 displayed, without directly checking the disposition unit 240, and determine suction holes 241 to be used for suction. In addition, since the user selects suction holes 241 to be opened, from the suction holes 241 corresponding to the positions displayed on the display area 310, suction is realized in a state where the desired suction holes 241 are open. Therefore, the processor 110 can realize suction in a mode desired by the user, without requiring the user to manually block suction holes 241. As a result, the control device 100 can reduce the work burden of the user.

Also, in the present embodiment, for each suction hole 241, the control device 100 receives selection of whether to switch the suction hole to the second state or the first state. Therefore, the control device 100 can realize opening and closing for each suction hole 241.

Also, in the present embodiment, in response to designation of the selection assistance button 301, the control device 100 detects the area of a printing medium disposed on the disposition unit 240, and controls the UI unit 140 such that the UI unit displays an object indicating the detected area. In this way, the control device 100 can present the printing medium area on the disposition unit 240 to the user. Further, the control device 100 switches, to the second state, suction holes 241 included in the detected printing medium area. Therefore, the control device 100 can reduce the time and effort for the procedure of selecting objects 311 corresponding to the suction holes 241 included in the detected printing medium area.

Also, in the present embodiment, in response to designation of the selection assistance button 302, the control device 100 switches, to the second state, the suction holes 241 included in the designated position. Therefore, the control device 100 can reduce the time and effort for the procedure of selecting objects 311 corresponding to the suction holes 241 included in the designated position.

Also, in the present embodiment, the control device 100 stores information indicating whether each suction hole is in the second state or the first state, as setting information 130*a*. Therefore, the control device 100 can reflect the stored setting information 130*a* in the individual suction holes 241, and switches the states of the individual suction holes 241 to the states indicated by the stored setting information 130*a*. In this way, the control device 100 can easily reproduce the states of the individual suction holes 241 stored as the setting information 130*a*.

(1-2) Suction Control Process

Figure 6:
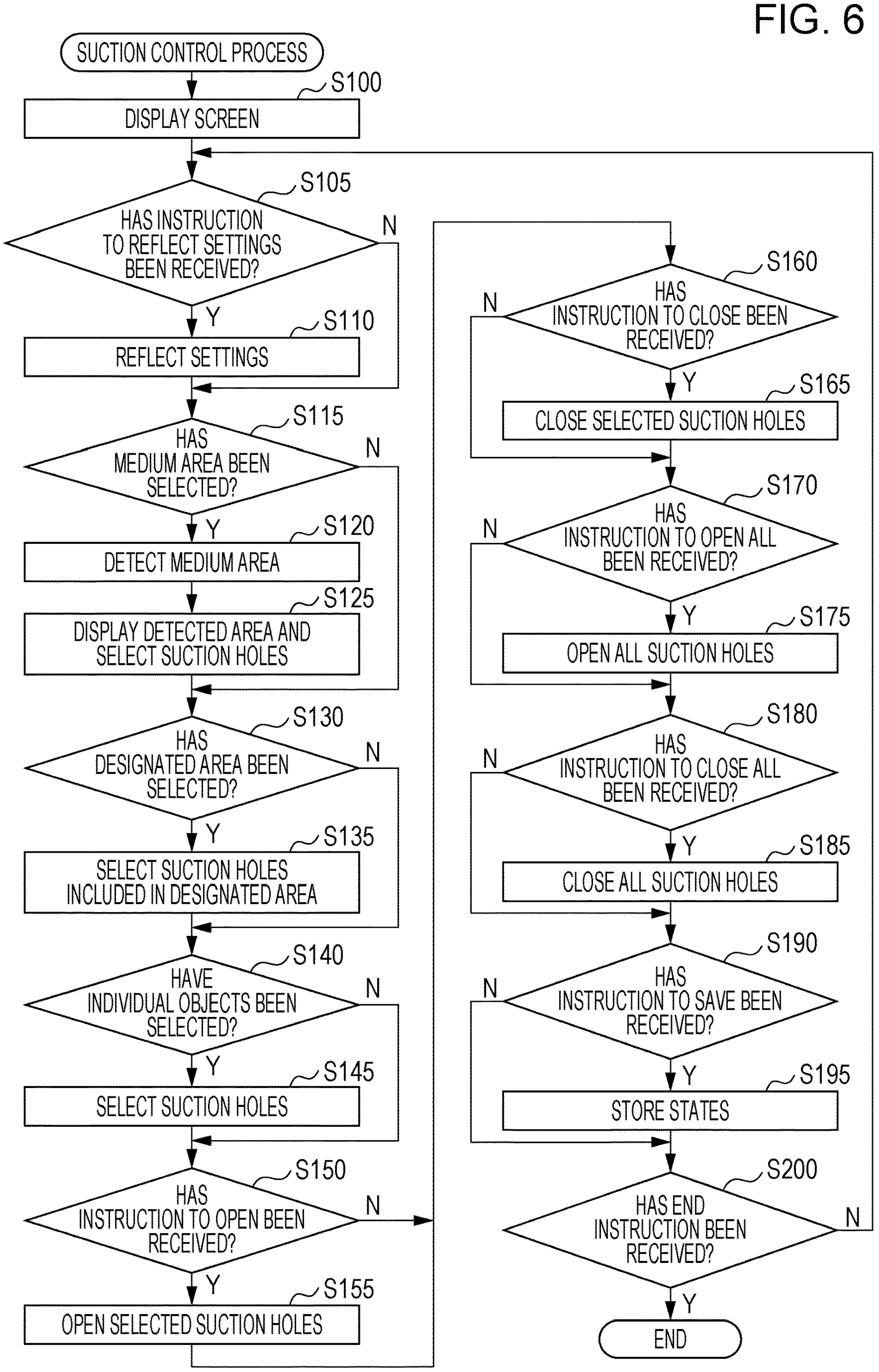
FIG. 6 is a flowchart illustrating an example of a suction control process.

A suction control process which the control device 100 executes will be described using FIG. 6. At a timing when the start of a suction control process is instructed via the UI unit 140, the processor 110 starts the process of FIG. 6.

In Step S100, the processor 110 displays the display screen 300 on the UI unit by the function of the display control unit 111*a*. The process of Step S100 is an example of a display control step. After the process of Step S100 is completed, the processor 110 advances the process to Step S105.

In Step S105, the processor 110 determines whether designation of the setting reflecting button 308 performed by a user's operation on the UI unit 140 has been received or not, by the function of the selection receiving unit 111*b*. When determining that designation of the setting reflecting button 308 has been received, the processor 110 advances the process to Step S110, whereas when determining that designation of the setting reflecting button 308 has not been received, the processor advances the process to Step S115.

In Step S110, the processor 110 displays a dialog usable for selection of setting information 130*a*, on the UI unit 140, by the function of the selection receiving unit 111*b*. Then, the processor 110 receives selection of setting information 130*a* via the displayed dialog. The processor 110 updates the states of the individual suction holes 241 as indicated by the selected setting information 130*a*. Further, the processor 110 displays, in the first color, objects 311 corresponding to suction holes 241 which are in the first state. Furthermore, the processor 110 displays, in the third color, objects 311 corresponding to suction holes 241 which are in the second state.

In Step S115, the processor 110 determines whether the selection assistance button 301 has been designated by a user's operation on the UI unit 140, by the function of the selection receiving unit 111*b*. When determining that the selection assistance button 301 has been designated, the processor 110 advances the process to Step S120, whereas when determining that the selection assistance button 301 has not been designated, the processor advances the process to Step S130.

In Step S120, the processor 110 instructs the printing apparatus 200 to operate the suction mechanism 250 at a predetermined drive power in a state where a printing medium is disposed on the disposition unit 240 of the printing apparatus 200 and all of the suction holes 241 are open, by the function of the detecting unit 111*c*. In response to the instruction, the processor 210 of the printing apparatus 200 operates the suction mechanism 250. Further, the processor 110 instructs the printing apparatus 200 to measure the gas pressures in the spaces coupled to the individual suction holes 241. In response to the instruction, the processor 210 starts measuring the gas pressures in the spaces coupled to the individual suction holes 241 by the measuring units 270. The processor 210 waits until the gas pressures in the spaces coupled to the individual suction holes 241 become stable. Then, for the individual suction holes 241, the processor 110 measures the gas pressures in the spaces coupled thereto. The processor 210 notifies the control device 100 of the gas pressures measured for the individual suction holes 241. For each suction hole 241, the processor 110 compares the received gas pressure with the calibration value measured in advance. The processor 110 specifies, among the suction holes 241, suction holes 241 in which differences obtained by subtracting the calibration values from the measured gas pressures are equal to or larger than the predetermined threshold. Then, the processor 110 determines that the printing medium covers the specified suction holes 241, and detects the area around the specified suction holes 241, as a printing medium area. After the process of Step S120 is completed, the processor 110 advances the process to Step S125.

In Step S125, the processor 110 switches, to the second state, the suction holes 241 included in the printing medium area detected in Step S120 by the function of the selection receiving unit 111*b*, and displays, in the second color, the objects 311 corresponding to the suction holes 241 switched to the second state. Further, the processor 110 displays an object indicating the printing medium at the position in the display area 310 corresponding to the specified printing medium area. After the process of Step S125 is completed, the processor 110 advances the process to Step S130.

In Step S130, the processor 110 determines whether a position has been designated by designation of the selection assistance button 302, by the function of the selection receiving unit 111*b*. When determining that a position has been designated, the processor 110 advances the process to Step S135, whereas when determining that any position has not been designated, the processor advances the process to Step S140.

In Step S135, the processor 110 switches, to the second state, suction holes 241 included in the position determined as designated in Step S130 by the function of the selection receiving unit 111*b*, and displays, in the second color, the objects 311 corresponding to the suction holes 241 switched to the second state. In addition, the processor 110 displays an object indicating the printing medium at the position in the display area 310 corresponding to the specified printing medium area. After the process of Step S135 is completed, the processor 110 advances the process to Step S140.

In Step S140, the processor 110 determines whether designation of objects 311 corresponding to suction holes 241 has been received, by the function of the selection receiving unit 111*b*. When determining that designation of objects 311 has been received, the processor 110 advances the process to Step S145, whereas when determining that designation of objects 311 has not been received, the processor advances the process to Step S150.

In Step S145, when the suction holes 241 corresponding to the objects 311 designated by the function of the selection receiving unit 111*b* in Step S140 are in the first state, the processor 110 switches the suction holes to the second state, whereas when the suction holes are in the second state, the processor switches them to the first state. Then, the processor 110 updates the color of the objects 311 corresponding to the suction holes 241 having the updated state, with the color according to the state. After the process of Step S145 is completed, the processor 110 advances the process to Step S150. The process from Step S115 to Step S145 is an example of a selection receiving step.

In Step S150, the processor 110 determines whether designation of the opening instruction button 303 has been received, by the function of the execution control unit 111*d*. When determining that designation of the opening instruction button 303 has been received, the processor 110 advances the process to Step S155, whereas when determining that designation of the opening instruction button 303 has not been received, the processor advances the process to Step S160.

In Step S155, by the function of the execution control unit 111*d*, the processor 110 instructs the printing apparatus 200 to open the suction holes 241 which are in the second state. Also, the processor 110 instructs the printing apparatus 200 to close the suction holes 241 which are in the first state. In response to the instructions, the processor 210 of the printing apparatus 200 opens the suction holes 241 which are in the second state and closes the suction holes 241 which are in the first state, by the opening/closing mechanisms 260. Then, the processor 110 instructs the printing apparatus 200 to perform an operation of sucking air from the open suction holes 241. In response to the instruction, the processor 210 of the printing apparatus 200 starts suction by the suction mechanism 250. The process of Step S155 is an example of an execution control step. After the process of Step S155 is completed, the processor 110 advances the process to Step S160.

In Step S160, the processor 110 determines whether designation of the closing instruction button 304 has been received, by the function of the execution control unit 111*d*. When determining that designation of the closing instruction button 304 has been received, the processor 110 advances the process to Step S165, whereas when determining that designation of the closing instruction button 304 has not been received, the processor advances the process to Step S170.

In Step S165, by the function of the execution control unit 111*d*, the processor 110 instructs the printing apparatus 200 to close the suction holes 241 which are in the second state. Also, the processor 110 instructs the printing apparatus 200 to open the suction holes 241 which are in the first state. In response to the instructions, the processor 210 of the printing apparatus 200 closes the suction holes 241 which are in the second state and opens the suction holes 241 which are in the first state, by the opening/closing mechanisms 260. Then, the processor 110 instructs the printing apparatus 200 to perform an operation of sucking air from the open suction holes 241. In response to the instruction, the processor 210 of the printing apparatus 200 starts suction by the suction mechanism 250. The process of Step S165 is an example of an execution control step. After the process of Step S165 is completed, the processor 110 advances the process to Step S170.

In Step S170, the processor 110 determines whether designation of the all-opening instruction button 305 has been received, by the function of the execution control unit 111*d*. When determining that designation of the all-opening instruction button 305 has been received, the processor 110 advances the process to Step S175, whereas when determining that designation of the all-opening instruction button 305 has not been received, the processor advances the process to Step S180.

In Step S175, the processor 110 instructs the printing apparatus 200 to open all of the suction holes 241, by the function of the execution control unit 111*d*. In response to the instruction, the processor 210 of the printing apparatus 200 opens all of the suction holes 241 by the opening/closing mechanisms 260. Then, the processor 110 instructs the printing apparatus 200 to perform an operation of sucking air from all of the open suction holes 241. In response to the instruction, the processor 210 of the printing apparatus 200 starts suction by the suction mechanism 250. After the process of Step S175 is completed, the processor 110 advances the process to Step S180.

In Step S180, the processor 110 determines whether designation of the all-closing instruction button 306 has been received, by the function of the execution control unit 111*d*. When determining that designation of the all-closing instruction button 306 has been received, the processor 110 advances the process to Step S185, whereas when determining that designation of the all-closing instruction button 306 has not been received, the processor advances the process to Step S185.

In Step S185, the processor 110 instructs the printing apparatus 200 to close all of the suction holes 241, by the function of the execution control unit 111*d*. In response to the instruction, the processor 210 of the printing apparatus 200 closes all of the suction holes 241 by the opening/closing mechanisms 260. After the process of Step S185 is completed, the processor 110 advances the process to Step S190.

In Step S190, the processor 110 determines whether the setting storing button 307 has been designated, by the function of the storage control unit 11*e*. When determining that the setting storing button 307 has been designated, the processor 110 advances the process to Step S195, whereas when determining that the setting storing button 307 has not been designated, the processor advances the process to Step S200.

In Step S195, by the function of the storage control unit 11*e*, the processor 110 specifies whether each suction hole 241 is in the second state or the first state, and stores the specified information as setting information 130*a* in the storage medium 130. After the process of Step S195 is completed, the processor 110 advances the process to Step S200.

In Step S200, the processor 110 determines whether a suction control process end instruction has been received via the UI unit 140, by the function of the selection receiving unit 111*b*. When determining that a suction control process end instruction has been received, the processor 110 instructs the printing apparatus 200 to stop when a suction operation is being executed, and ends the process of FIG. 6. When determining that a suction control process end instruction has not been received, the processor 110 advances the process to Step S105.

(2) Second Embodiment

Differences in the process of the control device 100 of the present embodiment from the first embodiment will be described.

Figure 7:
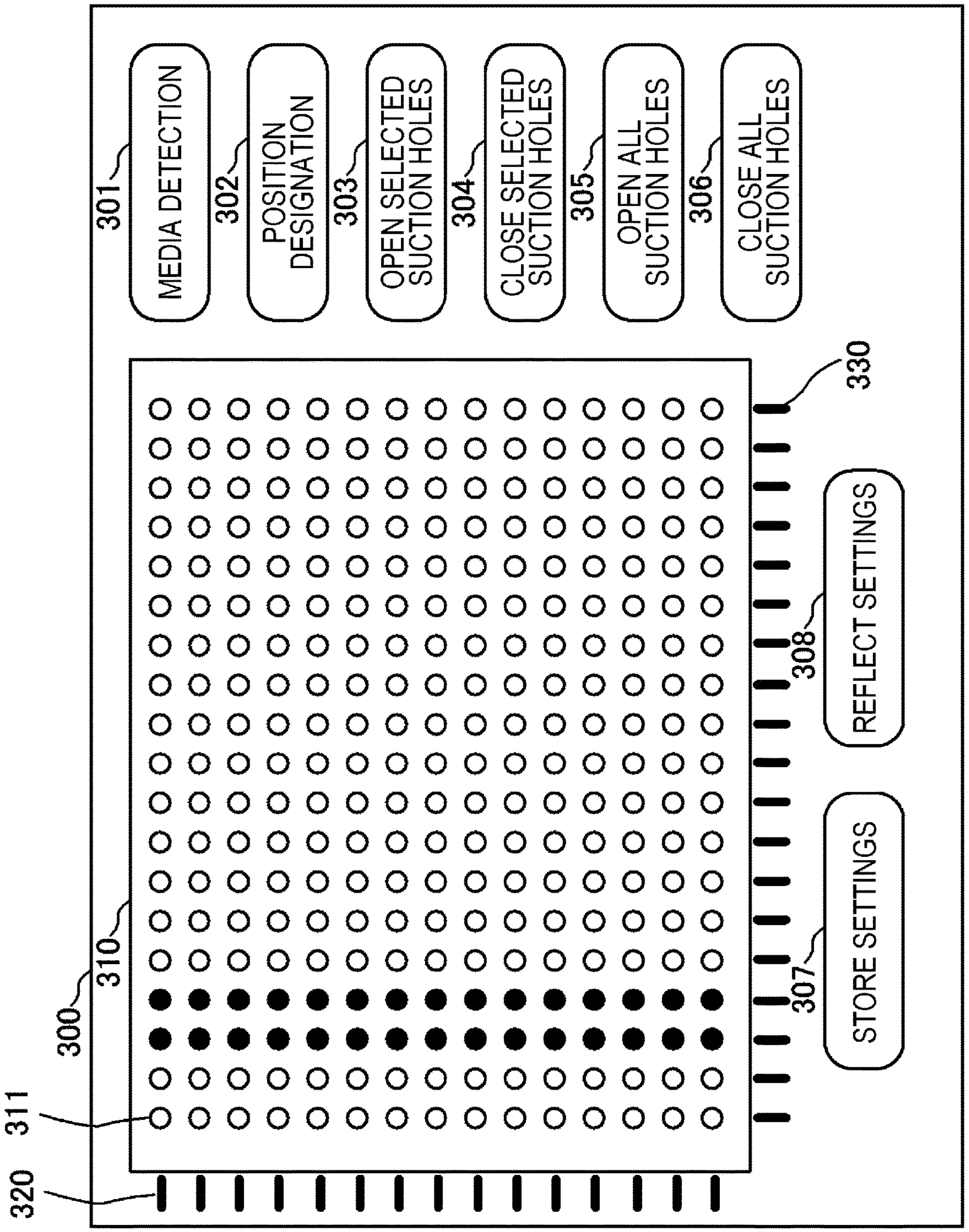
FIG. 7 illustrates an example of the display screen.

The processor 110 displays a display screen 300 on the UI unit 140 by the function of the display control unit 111*a*. An example of the display screen 300 of the present embodiment is shown in FIG. 7. As shown in FIG. 7, the display screen 300 of the present embodiment is different from the first embodiment in that it includes bar-shaped objects 320 usable to select the objects 311 for each row and bar-shaped objects 330 usable to select the objects 311 for each column. The objects 320 are disposed on the left side of the display area 310, and are provided for the individual rows of objects 311. The objects 330 are disposed on the lower side of the display area 310, and are provided for the individual columns of objects 311.

When the user designates an object 320 by operating the UI unit 140, the processor 110 receives the designation by the function of the selection receiving unit 111*b*, and performs the following process. In other words, the processor 110 specifies the states of a plurality of individual objects 311 included in the row corresponding to the designated object 320. Further, when the specified states include the first state, the processor 110 switches, to the second state, the suction holes 241 corresponding to the objects 311 included in the row corresponding to the designated object 320. Further, the processor 110 displays, in the second color, the objects 311 included in the row corresponding to the designated object 320. However, when the specified states do not include the first state, the processor 110 switches, to the first state, the suction holes 241 corresponding to the objects 311 included in the row corresponding to the designated object 320.

Also, when the user designates an object 330 by operating the UI unit 140, the processor 110 receives the designation by the function of the selection receiving unit 111*b*, and performs the following process. In other words, the processor 110 specifies the states of a plurality of objects 311 included in the column corresponding to the designated object 330. Then, when the specified states include the first state, the processor 110 switches, to the second state, the suction holes 241 corresponding to the objects 311 included in the column corresponding to the designated object 330. Further, the processor 110 displays, in the second color, the objects 311 included in the column corresponding to the designated object 330. However, when the specified states do not include the first state, the processor 110 switches, to the first state, the suction holes 241 corresponding to the objects 311 included in the column corresponding to the designated object 330.

The example of FIG. 7 shows that the third and fourth objects 330 from the left are designated, and the objects 311 included in the columns corresponding to the designated objects 330 are displayed in the second color (black).

As described above, with the configuration of the present embodiment, the control device 100 can control opening and closing of the suction holes 241 for each row and for each column. Therefore, the control device 100 can improve the user's convenience, for example, when it is desired to open and close the suction holes 241 for each row and for each column, or when it is possible to open and close the suction holes 241 only for each row or only for each column.

(3) Third Embodiment

Differences in the process of the control device 100 of the present embodiment from the first embodiment will be described.

After a display screen 300 is displayed, the processor 110 performs the following process by the function of the selection receiving unit 111*b*. The processor 110 determines whether there is any print job which it has been instructed to print. When determining that there is no print job which it has been instructed to print, the processor 110 performs the same process as that in the first embodiment. On the other hand, when determining that there is a print job which it has been instructed to print, the processor 110 specifies a print position which is a position on the disposition unit 240 to undergo printing, from the print job determined as existing.

Figure 8:
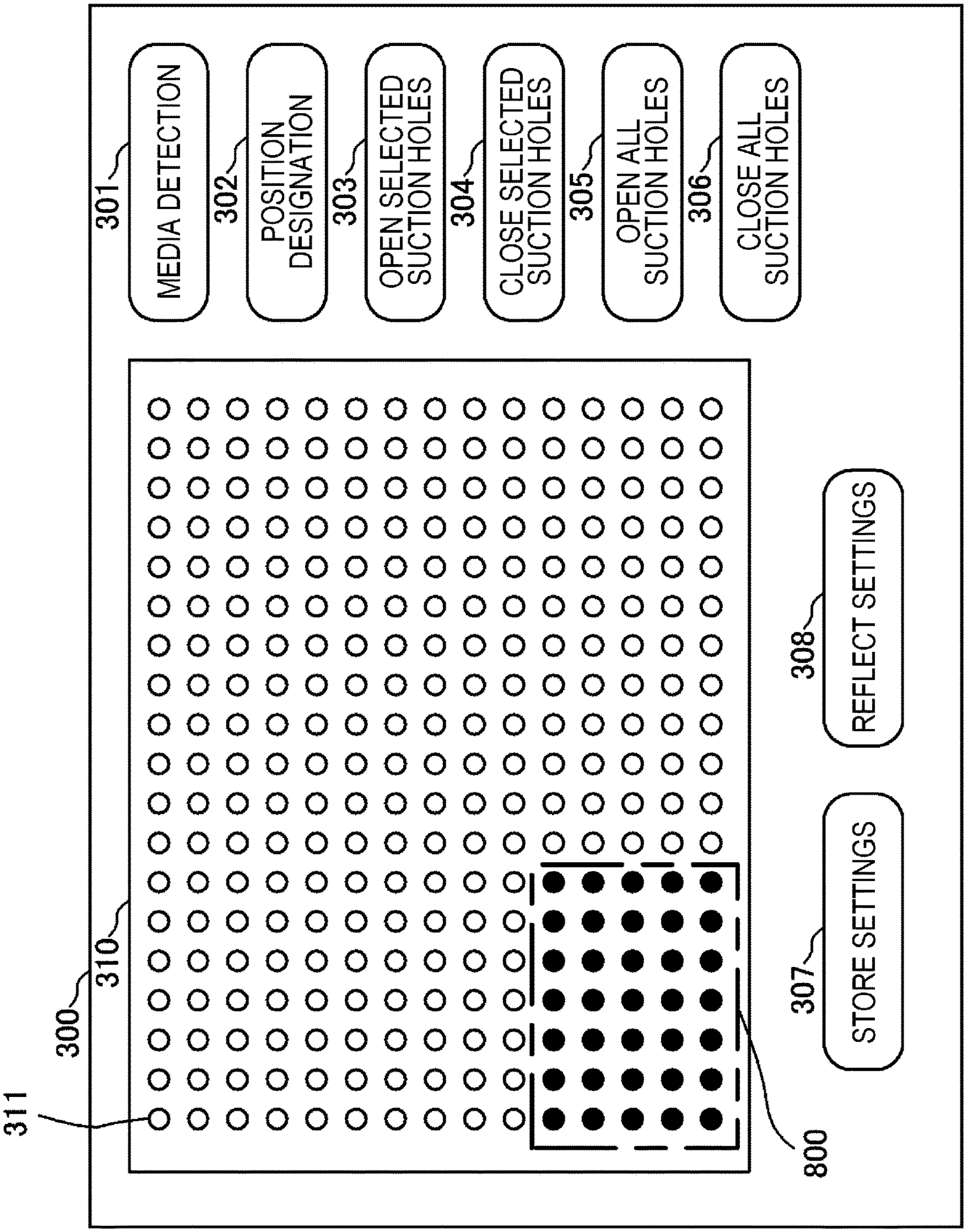
FIG. 8 illustrates an example of the display screen.

Then, the processor 110 displays an object indicating the specified print position at the position in the display area 310 corresponding to the specified print position. Further, the processor 110 switches, to the second state, the suction holes 241 included in the specified print position, and displays, in the second color, the objects 311 corresponding to the suction holes 241 switched to the second state. FIG. 8 shows a situation in which a print position is specified and an object 800 corresponding to the print position is displayed on the display area 310. The objects 311 in the object 800 correspond to the suction holes 241 switched to the second state, and are displayed in the second color (black).

Thereafter, the processor 110 receives the user's selection of the second state or the first state for each suction hole 241.

As described above, with the configuration of the present embodiment, the control device 100 can improve the user's convenience, for example, when it is desired to open and close the suction holes 241, or when it is possible to control opening and closing of the suction holes 241 only for each row or only for each column.

Since a printing medium may be disposed at the print position for the print job, it may be desired to open the suction holes 241 included in the print position. For this reason, the processor 110 may switch the suction holes 241 included in the print position to the second state, thereby reducing the time and effort for the procedure of selecting the suction holes 241 by the user.

(4) Other Embodiments

The above embodiments are examples for implementing the present disclosure, and various other embodiments can be adopted. For example, in each of the above-described embodiments, the control device 100 and the printing apparatus 200 are configured as different devices; however, both may be configured as the same device. For example, each function of the control device 100 may be installed in the printing apparatus 200. Also, the control device 100 may be composed of a plurality of devices. Also, the processing order of the flowchart shown in FIG. 6 may be changed. For example, the order of the process from Step S105 to Step S110, the process from Step S115 to Step S125, the process from Step S130 to Step S135, and the process from Step S140 to Step S145 may be changed.

In each of the above-described embodiments, the processor 110 is configured to open suction holes 241 which are in the second state (or the first state) and close suction holes 241 which are in the first state (or the second state) during a suction operation according to designation of the opening instruction button 303 (or the closing instruction button 304).

However, the processor 110 may be configured to open at least some of suction holes 241 which are in the second state (or the first state) during a suction operation. For example, when suction holes 241 in the disposition surface of the disposition unit 240 which are included in a polygonal (e.g., triangular or rectangular) area are in the second state (or the first state), the processor 110 may operate as follows. In other words, the processor 110 may open some suction holes 241 including at least the suction holes 241 closest to the respective vertices among the suction holes 241 included in the polygonal area. Also, the processor 110 may open some suction holes 241 including at least the suction holes 241 arranged along the outer periphery of the polygonal area among the suction holes 241 included in the polygonal area.

Also, the processor 110 may open suction holes 241 adjacent to suction holes 241 which are in the first state (or the second state) and suction holes 241 positioned at the ends in the main scanning direction or the sub-scanning direction, among the suction holes 241 which are in the second state (or the first state).

Also, the processor 110 may open a predetermined ratio (e.g., 80% or 90%) or more of suction holes 241 among the suction holes 241 which are in the second state (or the first state).

Also, the processor 110 may close at least some of suction holes 241 which are in the first state (or the second state) during a suction operation.

Also, the processor 110 may close a predetermined ratio (e.g., 80% or 90%) or more of suction holes 241 among the suction holes 241 which are in the first state (or the second state).

Also, in each of the above-described embodiments, the suction mechanism 250 is coupled to all of the suction holes 241 and performs suction of air from open suction holes 241. However, the suction mechanism 250 may be provided for each suction hole 241 such that each suction mechanism 250 performs suction of air from one suction hole 241. The suction mechanism 250 may be provided for each group of suction holes 241 (e.g., three or four suction holes 241) such that each suction mechanism 250 performs suction of air from a group of suction holes 241.

Also, in each of the above-described embodiments, the processor 110 switches suction holes 241 included in a printing medium area to the second state in response to designation of the selection assistance button 301. However, the processor 110 need not perform the process according to designation of the selection assistance button 301. In this case, the display screen 300 need not include the selection assistance button 301.

Also, in each of the above-described embodiments, the processor 110 switches suction holes 241 included in a designated position to the second state in response to designation of the selection assistance button 302. However, the processor 110 need not perform the process according to designation of the selection assistance button 302. In this case, the display screen 300 need not include the selection assistance button 302.

Also, in each of the above-described embodiments, when any one of the buttons 303 to 305 is designated, the processor 110 instructs the printing apparatus 200 to execute a suction operation. However, the processor 110 may instruct the printing apparatus 200 to execute a suction operation at other timings. For example, when at least one suction hole 241 is switched to the second state, the processor 110 may instruct the printing apparatus 200 to open suction holes 241 which are in the second state and start a suction operation, such that the printing apparatus 200 executes the suction operation.

Also, when any one of the buttons 303 to 305 is designated, the processor 110 may instruct the printing apparatus 200 to execute only control on opening and closing of the suction holes 241. Then, the processor 110 may instruct the printing apparatus 200 to execute a suction operation while instructing to execute printing on a printing medium.

Also, in each of the above-described embodiments, the measuring units 270 are sensors which are provided in the spaces coupled to the individual suction holes 241 and which measure the pressures applied to the gas in the spaces coupled to the suction holes 241 (gas pressures) when air is sucked through the suction mechanism 250. However, the measuring units 270 may be other sensors. For example, the measuring units 270 may be sensors which are provided in the vicinities of the suction holes 241 and which measure the pressures applied to the portions of the disposition surface near the suction holes 241 when air is sucked through the suction mechanism 250. In this case, the processor 110 may use the pressures applied to the portions of the disposition surface near the suction holes 241 in place of the gas pressures in the spaces coupled to the suction holes 241 in the above-described embodiments.

Also, in each of the above-described embodiments, the measuring units 270 are used to detect a printing medium area. However, the measuring units 270 may be used for other purposes. For example, the processor 110 may obtain the gas pressures in the spaces coupled to the individual suction holes 241, detected via the measuring units 270, from the printing apparatus 200, and determine the state of a printing medium, based on the obtained gas pressures. For example, when a suction hole 241 is open and the gas pressure in the space coupled to the suction hole 241 is lower than a predetermined first threshold, the processor 110 may determine that the printing medium may be wavy. Also, when a suction hole 241 is open and the gas pressure in the space coupled to the suction hole 241 is lower than a predetermined second threshold smaller than the first threshold, the processor 110 may determine that the printing medium may be out of place. Further, the processor 110 may display information indicating the determination result, on the UI unit 140.

Also, in the above-described embodiments, the setting information 130*a* is information indicating whether each of the plurality of suction holes, for sucking a printing medium, provided in the disposition unit of the printing apparatus 200 on which printing media can be disposed has been selected or not. The setting information 130*a* may be stored in association with print jobs. For example, when printing according to a print job is executed, the processor 110 may reflect the states indicated by the setting information 130*a* associated with the print job in the individual suction holes 241, and display a display screen 300.

Also, in the above-described second embodiment, the processor 110 performs switching of the states of the suction holes 241 for each row and for each column according to designation of the objects 320 and the objects 330, and performs switching of the states of the suction holes 241 for each suction hole 241 according to designation of the objects 311. However, the processor 110 need not perform switching of the states of the suction holes 241 for each suction hole 241 according to designation of the objects 311.

In addition, the present disclosure is also applicable as programs or methods which computers execute. Also, the present disclosure includes various modes; for example, systems, programs, and methods as described above may be implemented as a single device or may be implemented using components of a plurality of devices. Also, modifications can be made as appropriate; for example, systems, programs, and methods as described above may be implemented partially with software and partially with hardware. Further, the present disclosure can be implemented as a recording medium containing a program for controlling a system. The recording medium containing the program may be a magnetic recording medium, a semiconductor memory, or any recording medium to be developed in the future.

Furthermore, the above-described embodiments do not limit the present disclosure. Since the embodiments include a plurality of aspects of the present disclosure having different effects, one object or effect which can be read from the description of the embodiments is not necessarily an object or effect for all of the aspects included in the embodiments.

What is claimed is:

1. A control device for controlling an image processing apparatus including a disposition unit on which a printing medium is disposed and which has a plurality of suction holes for sucking the printing medium, the control device comprising:

a display controller that displays, on a display unit, a display screen which is a screen showing a plurality of first objects indicating positions of the plurality of suction holes in the disposition unit and a plurality of second objects which correspond to each row or column of the plurality of first objects;

a selection receiver that receives, via the plurality of second objects, selection of row or column of suction holes to be opened or closed from the plurality of suction holes whose positions are displayed on the display screen as the plurality of first objects; and an execution controller that performs control such that a suction operation is executed through at least some of the selected row or column of suction holes.

2. The control device according to claim 1, wherein the selection receiver receives, via the plurality of first objects, selection for each suction hole to be opened or closed from the plurality of suction holes; and the execution controller that performs control such that a suction operation is executed through at least some of the received selection for the each suction hole.

3. The control device according to claim 1, wherein the display controller displays, on the display unit, an area of the printing medium which is disposed on the disposition unit.

4. The control device according to claim 3, further comprising:

a detector that detects the area of the printing medium, which is disposed on the disposition unit, based on pressures in the plurality of suction holes during a suction operation, wherein the display controller displays the detected printing medium area on the display unit.

5. The control device according to claim 1, further comprising:

a detector that detects an area of the printing medium which is disposed on the disposition unit, based on pressures in the plurality of suction holes during a suction operation, wherein the selection receiver receives selection of suction holes included in the detected printing medium area.

6. The control device according to claim 1, wherein the selection receiver receives selection of at least one suction hole from the plurality of suction holes included in a designated area.

7. The control device according to claim 1, wherein the selection receiver receives selection of at least one suction hole from the plurality of suction holes included in a print position indicated by a print job.

8. A control method which is executed by a control device for controlling an image processing apparatus including a disposition unit on which a printing medium is disposed and which has a plurality of suction holes for sucking the printing medium, the method comprising:

displaying, on a display unit, a display screen which is a screen showing a plurality of first objects indicating positions of the plurality of suction holes in the disposition unit and a plurality of second objects which correspond to each row or column of the plurality of first objects;

receiving, via the plurality of second objects, selection of row or column of suction holes to be opened or closed from the plurality of suction holes whose positions are displayed on the display screen as the plurality of first objects; and performing control such that a suction operation is executed through at least some of the selected row or column of suction holes.

9. A system comprising:

an image processing apparatus that includes a disposition unit on which a printing medium is disposed and which has a plurality of suction holes for sucking the printing medium; and a control device that controls the image processing apparatus, wherein the control device includes a display controller that displays, on a display unit, a display screen which is a screen showing a plurality of first objects which indicates positions of the plurality of suction holes in the disposition unit and a plurality of second objects which corresponds to each row or column of the plurality of first objects, a selection receiver that receives, via the plurality of second objects, selection of row or column of suction holes to be opened or closed from the plurality of suction holes whose positions are displayed on the display screen as the plurality of first objects, and an execution controller that performs control such that a suction operation is executed through at least some of the selected row or column of suction holes.

* * * * *